United States Patent
Qiu et al.

(10) Patent No.: US 8,867,526 B2
(45) Date of Patent: Oct. 21, 2014

(54) METHOD AND APPARATUS FOR PROVIDING MOBILITY FOR A VOICE OVER INTERNET PROTOCOL SERVICE

(75) Inventors: Chaoxin Qiu, Austin, TX (US); Richard Khan, San Ramon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1649 days.

(21) Appl. No.: 11/750,086

(22) Filed: May 17, 2007

(65) Prior Publication Data

US 2008/0285544 A1 Nov. 20, 2008

(51) Int. Cl.
- *H04L 12/66* (2006.01)
- *H04L 29/08* (2006.01)
- *H04L 29/12* (2006.01)
- *H04L 29/06* (2006.01)
- *H04W 4/02* (2009.01)
- *H04M 3/51* (2006.01)

(52) U.S. Cl.
CPC ............ *H04L 65/1069* (2013.01); *H04L 67/18* (2013.01); *H04M 2242/04* (2013.01); *H04L 61/2084* (2013.01); *H04L 67/14* (2013.01); *H04M 2242/30* (2013.01); *H04W 4/02* (2013.01); *H04L 67/141* (2013.01); *H04L 29/12311* (2013.01); *H04M 3/5116* (2013.01); *H04L 65/40* (2013.01)
USPC ........... 370/352; 370/353; 370/355; 370/356; 370/389; 370/354

(58) Field of Classification Search
CPC ..................... H04L 29/12311; H04L 61/2084; H04L 65/1069; H04L 65/40; H04L 67/14; H04L 67/141; H04L 67/18; H04L 41/12; H04L 41/22; H04M 2242/04; H04M 2242/30; H04M 3/5116; H04M 7/006; H04W 4/02
USPC .......................................... 370/352–356, 389
See application file for complete search history.

(56) References Cited

U.S. PATENT DOCUMENTS

| | | | |
|---|---|---|---|
| 2003/0156577 A1* | 8/2003 | Dunlap et al. ................. | 370/352 |
| 2004/0057425 A1* | 3/2004 | Brouwer et al. .............. | 370/352 |
| 2004/0125923 A1* | 7/2004 | See et al. ..................... | 379/88.17 |
| 2006/0056388 A1* | 3/2006 | Livingood .................... | 370/352 |
| 2007/0049293 A1* | 3/2007 | Russell ....................... | 455/456.1 |
| 2007/0067807 A1* | 3/2007 | O'Neil .......................... | 725/62 |
| 2007/0104183 A1* | 5/2007 | Bakke et al. .................. | 370/352 |
| 2007/0189469 A1* | 8/2007 | Croak et al. ................... | 379/45 |
| 2007/0233899 A1* | 10/2007 | Aborn .......................... | 709/245 |
| 2007/0242660 A1* | 10/2007 | Xu ............................... | 370/352 |
| 2007/0253429 A1* | 11/2007 | James ...................... | 370/395.42 |
| 2008/0125077 A1* | 5/2008 | Velazquez et al. ......... | 455/404.2 |
| 2009/0034536 A1* | 2/2009 | Morand et al. ................ | 370/400 |

* cited by examiner

*Primary Examiner* — Asad Nawaz
*Assistant Examiner* — Khaled Kassim (57) ABSTRACT

A method and an apparatus for providing mobility for a Voice over Internet Protocol Service (VoIP) provided on packet networks are disclosed. For example, the method receives a register request from a user endpoint device and retrieves an Access Point-address parameter from a contact header in the register request. The method then determines a physical location of an access point device in accordance with the Access Point-address parameter and updates location information for the user endpoint device in accordance with the physical location of the access point device.

13 Claims, 6 Drawing Sheets

METHOD AND APPARATUS FOR PROVIDING MOBILITY FOR A VOICE OVER INTERNET PROTOCOL SERVICE

The present invention relates generally to communication networks and, more particularly, to a method for providing mobility for a Voice over Internet Protocol (VoIP) service provided on packet networks.

BACKGROUND OF THE INVENTION

Internet services such as Voice over Internet Protocol (VoIP) services are becoming ubiquitous and more and more businesses and consumers are relying on their Internet connections for both data and voice communications needs. One of the advantages of obtaining services on an Internet Protocol (IP) based infrastructure is the flexibility of being able to access services from anywhere with an Internet connection. Namely, customers are provided with more flexible options and can obtain the same service regardless of whether the call originated from a home, a hotel, a dormitory, etc. When a customer requests for a service, the customer's telephone number and device are associated with the service.

For example, a VoIP customer may move the telephone adaptor to a new location and continue accessing services while away from home. However, some services are provided based on the physical location of the caller. For example, calls to obtain emergency service, e.g., 911 service, are routed to the closest center equipped to provide the emergency service. For example, in North America, when a customer dials 911, the Public Switched Telephone Network (PSTN) uses the caller's telephone number to associate the call with a location (address), and provides the telephone number and location of the caller to the appropriate Public Safety Answering Point (PSAP).

When 911 calls originate in a packet network such as a VoIP network, the VoIP service provider is required by the Federal Communications Commission (FCC) to route the 911 call to the PSAP that serves the caller's present location. Further, VoIP services providers are required to provide the telephone number and to make the physical location of the caller available to the proper PSAP. For example, the VoIP service provider may obtain the service address when a customer subscribes to a VoIP service. However, due to the flexible nature of the VoIP service, the customer may at a later time move the customer endpoint device, e.g., analog terminal adaptor, softphone, IP phone, wireless phone, etc. to another physical location and continue accessing services. Thus, the address obtained during the service subscription may no longer be usable for calls that rely on the physical location of the caller, e.g., E911 calls. FCC regulations require the VoIP service provider to either provide access to 911 services at the new location or restrict the customer's service at the new location.

SUMMARY OF THE INVENTION

In one embodiment, the present invention discloses a method and apparatus for providing mobility for a Voice over Internet Protocol (VoIP) service provided over packet networks. For example, the method receives a register request from a user endpoint device and retrieves an Access Point-address parameter from a contact header in the register request. The method then determines a physical location of an access point device in accordance with the Access Point-address parameter and updates location information for the user endpoint device in accordance with the physical location of the access point device.

In an alternate embodiment, the method receives a register request from a user endpoint device, where the register request is received by an access point device. The method determines whether or not an Access Point-address parameter in a contact header of the register request is populated with an address of another access point device, and populates the Access Point-address parameter with an address of the access point device if the Access Point-address parameter is not already populated.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing mobility for a Voice over Internet Protocol (VoIP) service, e.g., as provided over IP Multi-Media Subsystem (IMS) networks. Although the present invention is discussed below in the context of an IMS network, the present invention is not so limited. Namely, the present invention can be applied to all networks capable of supporting VoIP.

Figure 1:
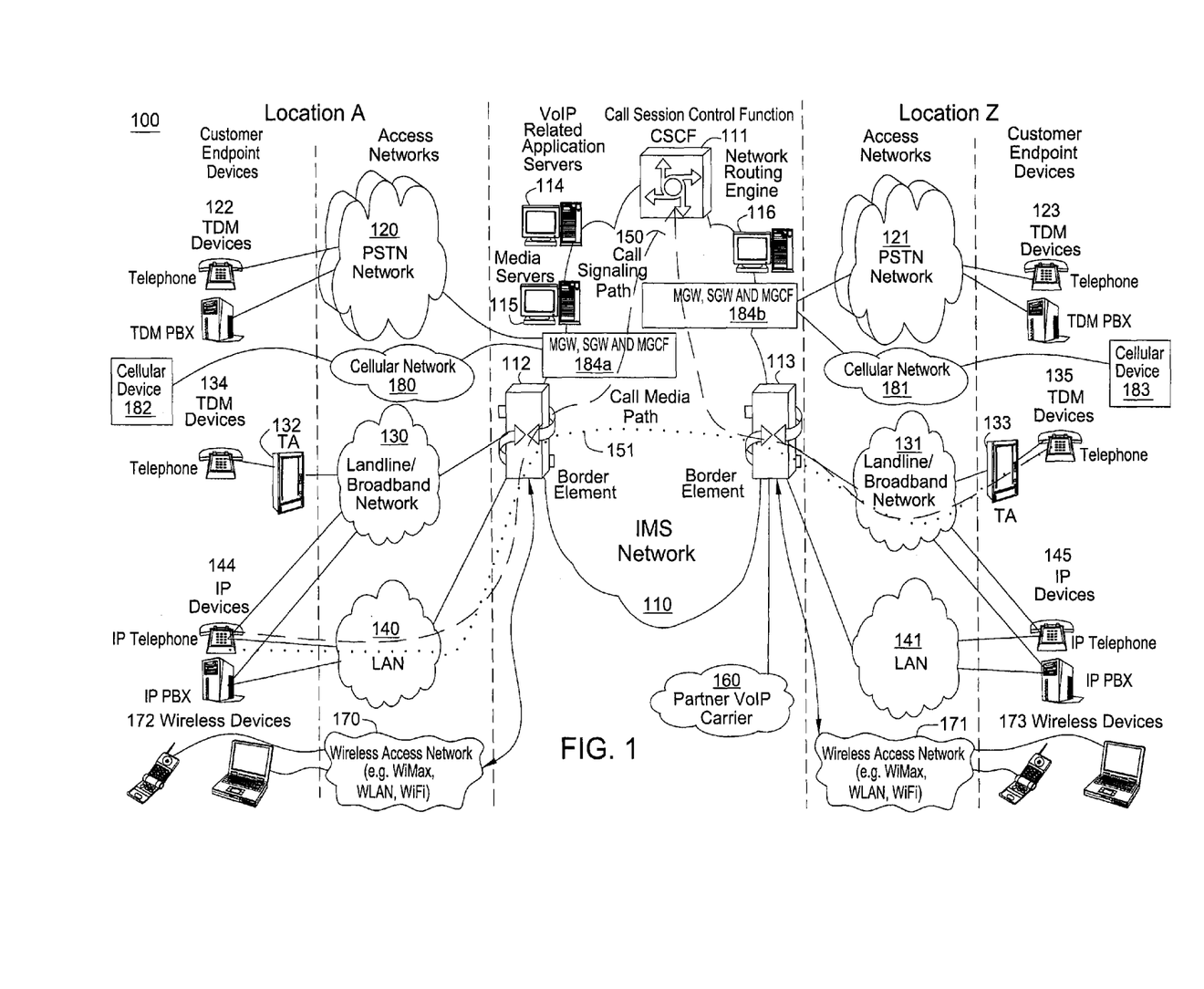
FIG. 1 illustrates an exemplary network related to the present invention.

To better understand the present invention, FIG. 1 illustrates an example network, e.g., a packet network such as a VoIP network related to the present invention. Exemplary packet networks include Internet protocol (IP) networks, Asynchronous Transfer Mode (ATM) networks, frame-relay networks, and the like. An IP network is broadly defined as a network that uses Internet Protocol to exchange data packets. Thus, a VoIP network is considered an IP network.

In one embodiment, the VoIP network may comprise various types of customer endpoint devices connected via various types of access networks to a carrier (e.g., a service provider) VoIP core infrastructure over an Internet-Protocol network. Broadly defined, a VoIP network is a network that is capable of carrying voice signals as data packets over an IP network. The present invention is described below in the context of an illustrative VoIP network. Thus, the present invention should not be interpreted as limited by this particular illustrative architecture.

The customer endpoint devices can be Time Division Multiplexing (TDM) based, IP based or wireless such as cellular phones. For example, TDM based customer endpoint devices 122, 123, 134, and 135 may comprise TDM phones or Private Branch Exchange (PBX). IP based customer endpoint devices 144 and 145 may comprise IP phones or IP PBX.

Wireless endpoint devices 172, 173, 182 and 183 may comprise cellular phones, pocket PCs, and the like that are capable of supporting protocols such as WiFi, WiMax, etc. It is important to not that cellular devices 182 and 183 may be dual mode, e.g. operate in both Wireless Fidelity (WiFi) and Global System for Mobile (GSM) communications modes. In one embodiment, the Terminal Adaptors (TA) 132 and 133 are used to provide necessary inter-working functions between TDM customer endpoint devices, such as analog phones, and packet based access network technologies, such as landline broadband access networks, e.g., Digital Subscriber Line (DSL) and cable networks. TDM based customer endpoint devices may access VoIP services by using either a Public Switched Telephone Network (PSTN) 120, 121 or a landline broadband access network 130, 131 via the TA 132 or 133. IP based customer endpoint devices may access VoIP services by using a Local Area Network (LAN) 140 and 141 or through the packet based access networks (e.g., landline broadband access networks) as shown in FIG. 1. Wireless endpoint devices may access VoIP services by using wireless LAN/WAN access networks 170 and 171, or cellular networks 180 and 181. The wireless access networks 170 and 171, LANs 140 and 141, and landline broadband access networks 130 AND 131 may be connected to the IMS 110 through the service provider's IP network or any other $3^{rd}$ party network. The IP network/$3^{rd}$ party network can then connect to the IMS 110 through a border element 112 or 113.

The PSTN networks 120 and 121, and the cellular networks 180 and 181 may be connected to the IMS 110 through Media Gateway (MGW), Signaling Gateway (SGW) and Media Gateway Controller (MGCF) network devices 184a and 184b. The network devices 184a and 184b are devices with a combination of Media Gateway (MGW), Signaling Gateway (SGW) and Media Gateway Controller (MGCF) functionalities. For example, the CSCF 111 communicates with MGCF using SIP for call session control. The MGCF uses the international standard for media gateway control H.248 (also known as MEGACO client-server protocol) to control MGW. MGCF may use Signal Transport (SIGTRAN) MTP-3 User Adaptation Layer (M3UA) or vendor proprietary Application Programming Interface (API) to control SGW. SGW is responsible for call signaling conversion between VoIP SIP and SS7-based signaling in PSTN (e.g., Integrated Services Digital Network User Part, also referred to as ISUP) and in cellular networks (e.g., Customized Applications for Mobile networks Enhanced Logic referred to as CAMEL, CAMEL Application Part referred to as CAP, etc.). MGW is responsible for media format conversion between VoIP (Real-time Transport Protocol based) and TDM in PSTN and Cellular networks).

The access networks for wired devices can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN or over a landline broadband access network such as DSL (130 and 131). A packet based access network 130 or 131, such as the landline broadband access network, when used together with the TA 132 or 133, is used to support TDM based customer endpoint devices. The access networks for wireless devices 170 and 171 can be Worldwide Interoperability for Microwave Access (WiMax), Wireless Local Area Networks (WLAN) or Wireless Fidelity (WiFi). The access networks for cellular devices 182 and 183 can be cellular networks 180 and 181.

In one embodiment, the core VoIP infrastructure is implemented in compliance with 3GPP IMS standard and comprises several key VoIP components, such as the Border Elements (BEs) 112 and 113, the Call Session Control Function (CSCF) 111, VoIP related Application Servers (AS) 114, Media Server (MS) 115, and Media Gateway (MGW), Signaling Gateway (SGW) and Media Gateway Controller (MGCF) network devices 184a and 184b. The Border Elements (also known as session border controllers) provide a secure traffic boundary for the VoIP service provider's network infrastructure. The access provider may expose its address/addresses for_Border Elements to user devices and hide the internal addresses of the VoIP service provider's network. The Access Session Border Controller is a container function that encompasses the 3GPP-TISPAN IMS signaling functions (Proxy—Call Session Control Function (P-CSCF), Interconnect Border Control Function (IBCF)) and media functions (Access Border Gateway Function (A-BGF), Interconnect Border Gateway Function (I-BGF)). The CSCF resides within the IMS infrastructure and is connected to the BEs, and Media Gateway Controller (MGCF) using the Session Initiation Protocol (SIP) over the underlying IP based core network 110. The CSCF performs network wide call control related functions as well as interacts with the appropriate application and media servers when necessary. The CSCF functions as a combination of a SIP proxy server and a SIP registrar and is a signaling endpoint for all call legs between all BEs and the CSCF. The CSCF may need to interact with various Application Servers (AS) in order to complete a call that requires certain service specific features, e.g., call forwarding.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140 to BE 112. BE 112 will then send a setup signaling message, such as a SIP-INVITE message if SIP is used, to CSCF 111. CSCF 111 forwards SIP messages to the necessary application server 114 to allow application servers to apply any additional feature processes that may be used to complete this call. In one embodiment, the Application Server (AS) functions as a back-to-back user agent. If BE 113 needs to be involved in completing the call, CSCF 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CSCF 111. After the CSCF 111 receives the call acknowledgement message, it will then send a call acknowledgement signaling message, such as a SIP 200 OK response message if SIP is used, toward the calling party. In addition, the CSCF 111 also provides the necessary information of the call to both BE 112 and BE 113 so that the media streams for call session exchange can proceed directly between BE 112 and BE 113. The call signaling path 150 and the call media path 151 are illustratively shown in FIG. 1. Note that the call signaling path and the call media path through the IMS network are different because once a call has been setup between two endpoint devices, the CSCF 111 does not need to be in the data path for actual direct data exchange.

Media Servers (MS) 115 are special servers that may handle and terminate media streams, and to provide services such as announcements, bridges, trans-coding, and Interactive Voice Response (IVR) messages for VoIP service applications. The media servers may also interact with customers for media session management to accomplish tasks such as process requests.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The MGW, SGW and MGCF network devices 184a and 184b are responsible for the necessary signaling protocol translation, e.g., SS7 to and from SIP, and media format conversion, such as TDM voice format to and from IP based packet voice format.

The above network is described to provide an illustrative environment in which packets are transported on packet networks, such as VoIP networks. One of the advantages of obtaining services on an Internet Protocol (IP) based infrastructure is the flexibility of being able to access services from anywhere with an Internet connection. When a customer requests a service, the service provider associates the request with the customer's telephone number and device (e.g., a terminal adaptor). For example, when a customer initiates a call, the telephone service provider associates the received request with the telephone number assigned to the customer. One of the concerns customers have about relying on the IP based services for all voice and data services is the fact that some services need to be delivered based on the physical location of the user, but the call may be originated from any location with an Internet access. For example, calls for emergency services, e.g., to a fire department, a police station, etc. are intended to be received by a Public Safety Answering Point (PSAP) that serves the caller's present location. PSAP serving area boundaries are defined by local 911 authorities (e.g., city and county governments, etc.). In order to clearly illustrate the teachings of the current invention, the following terminologies will first be described:

911 call;
911 tandem;
Public Safety Answering Point (PSAP); and
Enhanced 911 (E911).

A 911 call refers to a telephone call placed for the purpose of requesting emergency services. The public switched telephone network has been enabled to recognize specific telephone numbers as a call for emergency services. The universal emergency telephone number used in North America is 911. The emergency call is delivered based on geographical location of the caller to a public safety answering point as defined below.

A 911 tandem refers to a switch that is used to connect telephone switching centers to the various public safety answering points. For example, when a wireless caller dials 911, the call is routed to a mobile switching center. The mobile switching center is connected to the 911 tandem that determines the public safety answering point that can best service the call and then routes the call accordingly.

Public Safety Answering Point (PSAP) refers to a location where emergency calls are received and distributed to the appropriate emergency services such as the fire department, ambulance service, police dispatch locations, etc. The services that belong in a particular PSAP vary by community. The Incumbent Local Exchange Carrier (ILEC) manages the telephone equipment such as the 911 tandem that routes the call to the appropriate public safety answering point.

Enhanced 911 (E911) refers to an enhancement of technology that routes emergency calls (i.e., 911 calls) to the PSAP that has been designated to serve the caller's location, and delivers the caller's call back number (Automatic Number Identification, ANI)) and location (Automatic Location Identification, ALI).

Enhanced 911 calls are delivered over a dedicated E911 network to a Public Safety Answering Point (PSAP). The dedicated E911 network is contained within the traditional PSTN network. It should be noted that there will be PSAP that supports IP in the future. The calls are delivered based on the geographical location of the caller to the PSAP designated to serve that location. Regardless of the network used to initiate the 911 call, the 911 calls are eventually sent to the PSAP.

In one embodiment, a VoIP service provider may store a service address for a customer in a database when the customer initially subscribes to the VoIP service. When the customer initiates a 911 call from the service address, the VoIP service provider identifies the caller, retrieves the caller's phone number, and forwards the phone number to the 911 tandem that is located in the PSTN network. The VoIP service provider may also send an index that may be used to locate the customer's service address. The local exchange carrier with the PSTN network delivers the information from the 911 tandem to the proper PSAP. The call and the telephone number flow from the VoIP service provider towards the public safety answering point. The PSAP may use the index and the phone number to retrieve the caller's address.

In order to ensure that customers of VoIP service are able to access emergency services, the FCC mandates VoIP services to be provided only at a location where E911 calls are supported (E911 services). For example, service providers may restrict access to the VoIP service only to the known service address of a customer. For example, if a customer has a VoIP service at home, a VoIP operator may suspend the customer's access to the service when he/she attempts to access service from another location. For example, if a customer attempts to access the VoIP service from another location and the service provider determines that the customer may have moved, then the service provider may suspend access to the VoIP service. The customer may then contact the VoIP service provider to provide a new service address. However, this process requires the customer to provide new service address whenever the customer endpoint device is moved. Thus, the advantage of receiving services over an IP based network is diminished by the inconvenience of having to constantly provide the service provider with a new address when a user is traveling. For example, a consultant may have a home office (as the service address) but may be accessing services mostly away from home. Furthermore, a customer may not be permanently changing his/her address, e.g., the customer may temporarily be located at a hotel, an airport, a temporary office, etc.

The current invention discloses a method and apparatus for providing mobility for a VoIP service using an Access Point-address (AP-addr) parameter. In one embodiment, the AP-addr parameter of the current invention is located in a contact header of a register request as further described below. For example, the contact header contains a list of Universal Resource Locators (URLs) to be used to redirect future requests by routers that have application layer gateway functionality.

In one embodiment, a register request refers to a request sent by user endpoint devices to a special type of user agent server called a "registrar." A register request can be sent in support of a SIP discovery capability to enable sessions among users. More specifically, the discovery capability refers to a process of determining where to send session requests based on knowledge of the location of a user (e.g., an intended destination) and sending the request towards the destination. In order to perform discovery, SIP network elements may consult an abstract service called a "location service." The "location service" provides address bindings for a domain. The address bindings map an incoming SIP message to one or more Uniform Resource Identifiers (URI) closest to the desired destination. The location service provides the address bindings based on data gathered when the users register to receive services via the registrars. The "registration" refers to a user sending a "register" request to a registrar. A registrar operates as a front end server to the location service that receives "register" requests from the users, and places the information it receives in those requests into a location service for one or more domains it handles.

The current invention first implements access point devices with capability to populate an Access Point-address (AP-addr) parameter. For example, the AP-addr parameter is a parameter located in a contact header of a register request with its value set as an address, e.g., the public Internet Protocol (IP) address, of an access point device. It should be noted that the present invention is not limited to the use of the IP address of the access point device. Namely, any other addressing scheme that will allow proper identification of the physical location of the access point device is within the scope of the present invention.

In turn, the VoIP service provider is then able to record the physical locations of the access point devices and their public IP addresses in a database. For example, the service provider may maintain the IP addresses and the physical locations of the access point devices. For example, the IP addresses and the physical locations of hotspots for a Wireless Local Area Network (WLAN) may be recorded. In one embodiment, the access network may be managed by another service provider. If the access network is managed by another service provider, then the IP addresses and the physical locations of access point devices can be obtained by the VoIP service provider from the access service provider. In one embodiment, the current invention also records access point identifiers and various update data, e.g., a DNS name, a serial number, a time stamp of the last update, a name of an administrator performing the update, etc. Table 1 provides an example of a database table for storing location data for network access points. The access point's serial number or DNS name, IP address for a specific access point interface, validated street address, record of last update, and a record of administrator that made the update may be stored in the table.

TABLE 1

| Access Point identification | IP address | Physical location | Last Update | Updated by |
| --- | --- | --- | --- | --- |
| Access point's serial number or DNS name | IP address for a specific access point interface | Validated street address | A record of time whenever an update is done or a new record is created | A record of administrator's ID who performed an update or created an record |

In one embodiment, when a user endpoint device is powered up and tries to connect to the VoIP provider network, the user sends a VoIP register request via a customer or user endpoint device. The register request is received by an access point device that is closest to the customer endpoint device and it determines whether or not an AP-addr parameter is already provided in the contact header of the register request. If the AP-addr parameter does not exist in the contact header of the register request, then the access point device populates the AP-addr parameter in the contact header of the register request with its own public IP address. In turn, subsequent access point devices that may handle the register request note that the AP-addr parameter in the contact header has already been provided by the access point device closest to the user endpoint device originating the register request. As such, subsequent access point devices may simply forward the register request without altering the content of the AP-addr parameter.

In one embodiment, the current invention enables the VoIP service provider to receive a register request from a user endpoint device and retrieve the AP-addr parameter from the contact header in the register request. The value of the AP-addr parameter is then used to identify the access point device closest to the user who initiated the register request. For example, a VoIP user with a laptop computer may initiate a register request while physically located near a wireless access point device in the VoIP service provider's location database (e.g., a hotspot for a WLAN). The AP-addr parameter may then contain the public IP address of the wireless access point device closest to the user initiating the register request. The registrar may retrieve the value of the AP-addr parameter to identify the access point device closest to the user. More specifically, the physical location of the access point device corresponding to the public IP address extracted from the AP-addr parameter is determined from the location database. The service provider may then use the physical location of the access point device, as retrieved from the location database, to update the location information for the user. For example, if the physical location is different from the location used in a previous VoIP session, the service provider may update a Location Information Server (LIS) database for the user. It should be noted that the LIS database can be implemented as a part of the National Emergency Number Association (NENA) i2 architecture. The updated LIS database may be utilized for providing services that are based on physical location of the user, e.g., E911 services. In this manner, the service provider may provide E911 service at the current physical location of the user without having to require the customer to change his/her service address.

Figure 2:
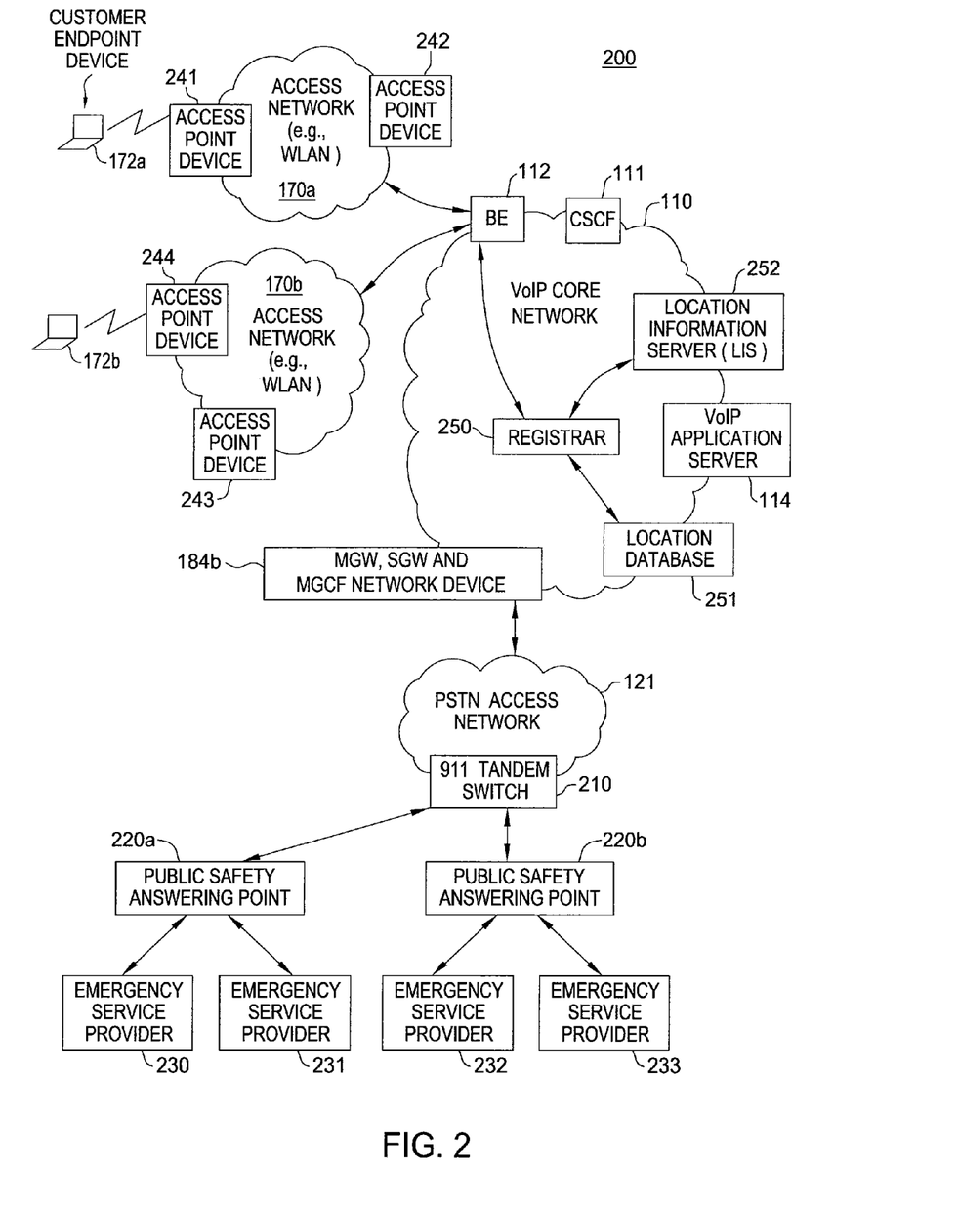
FIG. 2 illustrates an exemplary network with one embodiment of the present invention for providing mobility for a VoIP service.

FIG. 2 illustrates an exemplary network 200 with one embodiment of the present invention for providing mobility for a VoIP service. For example, a customer is using an endpoint device 172a or 172b to receive a VoIP service by accessing an IMS core network 110 through an access network 170a or 170b. The access network 170a may contain access point devices 241 and 242. The access network 170b may contain access point devices 243 and 244. The access networks 170a and 170b are both connected to the IMS core network 110 through a border element 112. The IMS core network 110 contains a registrar 250, a location database 251, a location information server 252, a call session control function 111, and a VoIP application server 114. It should be noted that the network components shown in FIG. 2 are only illustrative to disclose the present invention. As such, this is not an exhaustive list of network components in an IMS or, more generally, VoIP core infrastructure.

The IMS core network 110 is also connected to a PSTN access network 121 via an MGW, SGW and MGCF network device 184b. The IMS core 110 is capable of routing 911 calls to a 911 tandem switch 210 via MGW, SGW and MGCF network device 184b. In one embodiment, the 911-tandem switch is connected to a plurality of Public Safety Answering Points (PSAPs) 220a and 220b. In one embodiment, the PSAP can be broadly interpreted as a customer endpoint device. The 911 tandem switch forwards each 911 call to the closest public safety answering point based on the physical location of the caller. The public safety answering points 220a and 220b are, in turn, connected to various emergency service providers 230, 231, 232 and 233. Each community will determine the emergency services such as the local police department, ambulance service, fire department, and the like to be connected to the PSAP. Thus, a user using an endpoint device 172a or 172b is able to originate an emergency call that will be routed to a proper PSAP that will be able to service the emergency call.

In one embodiment, the VoIP service provider enables a customer to access the VoIP application server 114 and subscribe to a VoIP service with mobility. For example, the VoIP service provider may record the public IP addresses and physical location of the access point devices 241-244 in the location database 251. When the customer endpoint device 172a is in the vicinity of an access point device 241, the customer endpoint device 172a is able to access services through the access point device 241. For example, a wireless connection can be made between the access point device 241 and the customer endpoint device 172a. Similarly, when the customer endpoint device 172b is in the vicinity of the access point device 244, a wireless connection can be made between the access point device 244 and the customer endpoint device 172b.

For example, the customer endpoint device 172a may send a register request to the registrar 250 through the access point device 241. It should be noted that the access point device can be any device that can be assigned an IP address, e.g., a router, a switch, and the like. The access point device 241 will populate the AP-addr parameter with its own public IP address and forwards the register request to the registrar 250. The registrar determines the value of the AP-addr parameter in the register request and retrieves the physical location of the access point device 241 corresponding to the IP address (from the AP-addr parameter). The registrar then updates the customer information in the location information server 252. The service provider is then able to provide the VoIP service to the customer at the current physical location. If the customer initiates an E911 call using the customer endpoint device 172a, then the call and the updated information from the location information server are forwarded to the tandem switch 210 in the PSTN network 121.

Figure 3:
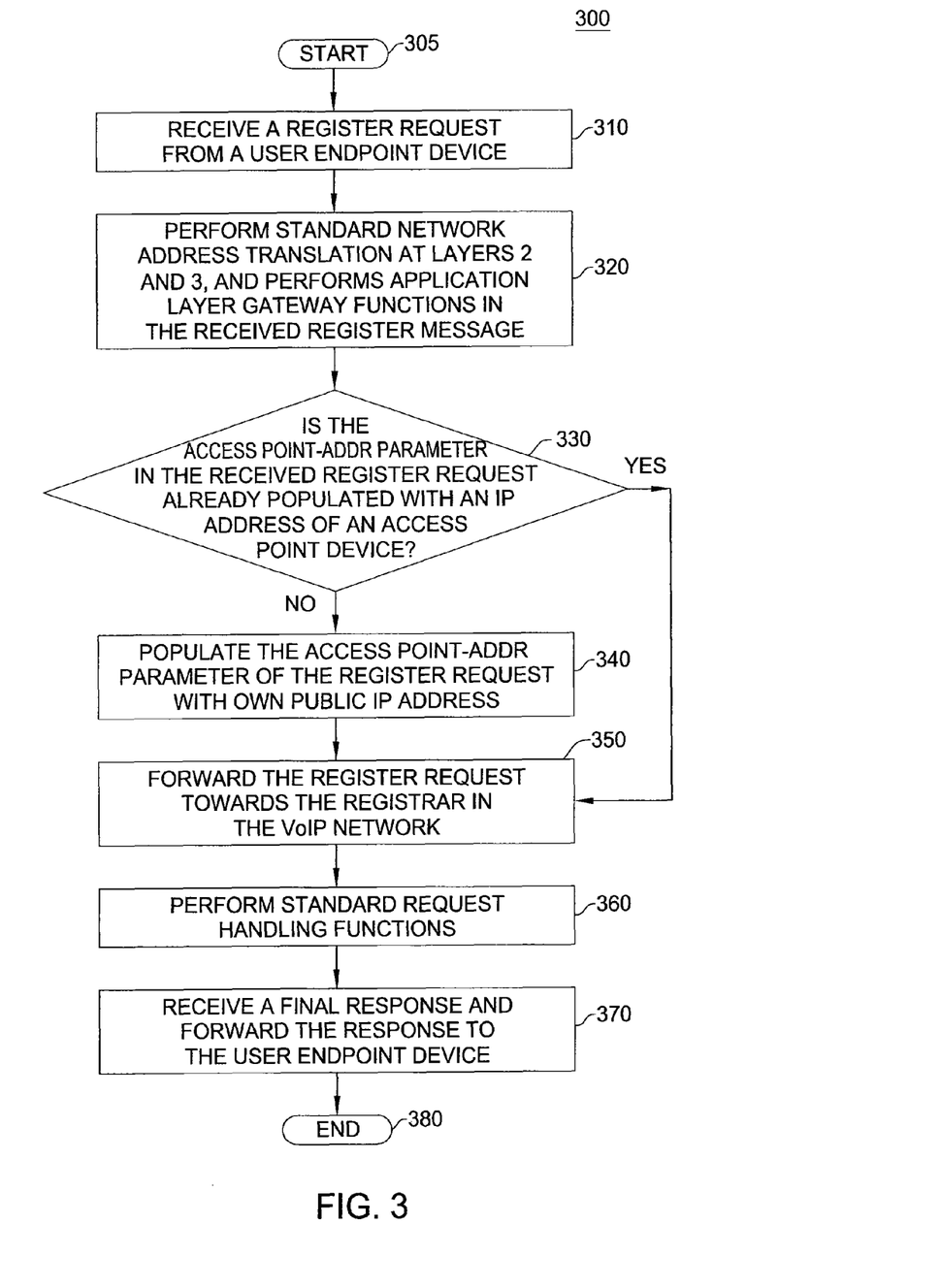
FIG. 3 illustrates a flowchart of a method for a network access point to support mobility for a VoIP service.

FIG. 3 illustrates a flowchart of a method 300 for a network access point to support mobility for a VoIP service. Method 300 starts in step 305 and proceeds to step 310.

In step 310, method 300 receives a register request from a user endpoint device. For example, a SIP register request with a contact header containing an IP address of an access point device is received.

In step 320, method 300 performs standard network address translation at Layers 2 and 3, and performs application layer gateway functions in the received register message. The method then proceeds to step 330.

In step 330, method 300 determines whether or not the AP-addr parameter in the received register request is already populated with an IP address of an access point device. For example, the method determines whether or not the AP-addr parameter contains an IP address for an access point device. If the AP-addr parameter is already populated with an IP address of an access point device, then the method proceeds to step 350. Otherwise, the method proceeds to step 340.

In step 340, method 300 populates the AP-addr parameter of the register request with its own public IP address. The method then proceeds to step 350.

In step 350, method 300 forwards the register request towards the registrar in the VoIP network. For example, the access point device forwards the register request having an IP address in the AP-addr parameter. The method then proceeds to step 360.

Note that if the access point device is not the access point device closest to the user, it would find that the AP-addr parameter has already been populated by the access point device closest to the user. Namely, subsequent access point devices will not alter the value of the AP-addr parameter.

In step 360, method 300 performs standard request handling functions. For example, the method waits for a response to the register request.

In step 370, method 300 receives a final response and forwards the response to the user end device. For example, the method may receive a "200 OK" and forwards the response towards the user. The method then proceeds to step 380 to end processing the current request or to step 310 to continue receiving requests. Method 300 ends in step 380.

Figure 4:
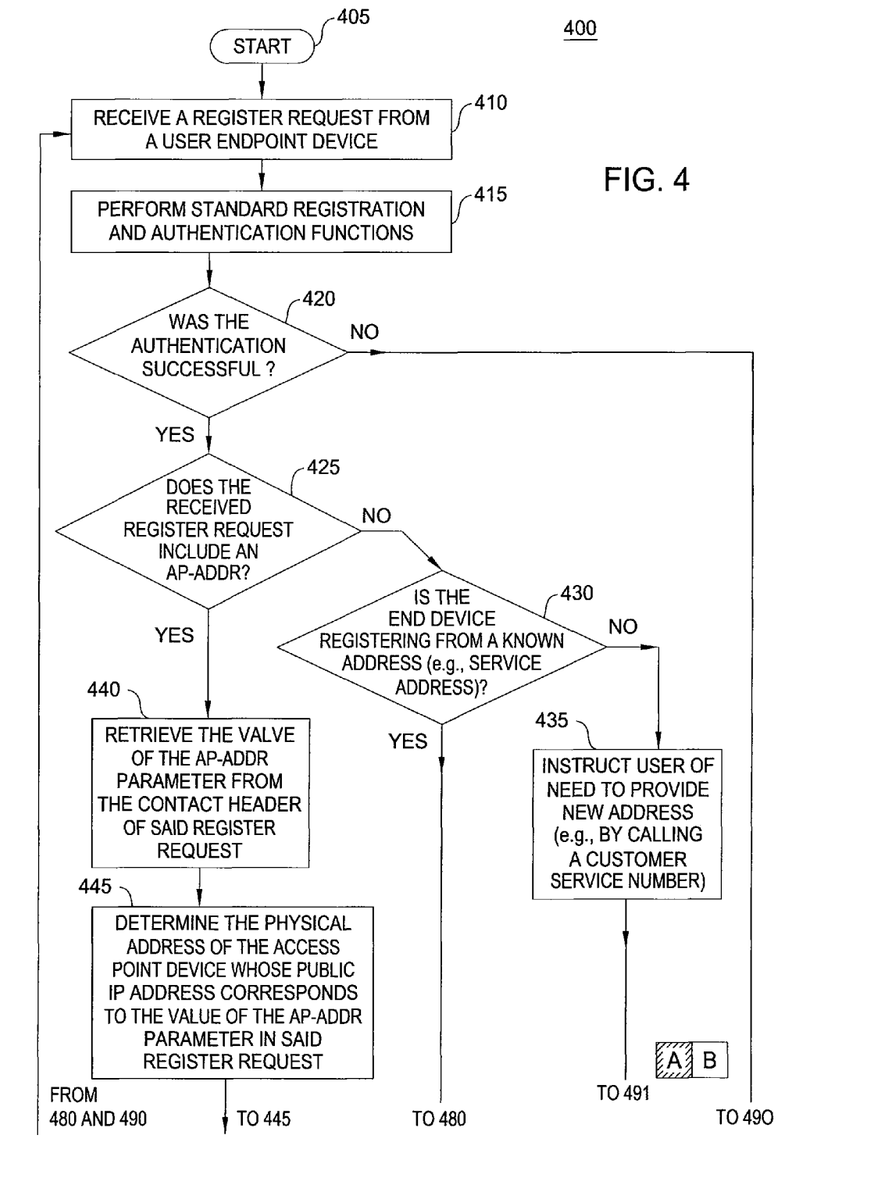
FIG. 4 illustrates a flowchart of a method for providing mobility for a VoIP service.

FIG. 4 illustrates a flowchart of a method 400 for providing mobility for a VoIP service. For example, method 400 can be implemented by the registrar. Method 400 starts in step 405 and proceeds to step 410.

In step 410, method 400 receives a register request from a user endpoint device. For example, a customer moves his/her endpoint device to a location near an access point device and originates a register request from said location. The register request is then forwarded towards a registrar by the access point device in the vicinity of the customer endpoint device.

In step 415, method 400 performs standard registration and authentication functions. For example, the method may perform authentication such as processing a password, a user ID, etc. and determines the service (or type of service) for the customer.

In step 420, method 400 determines whether or not the authentication was successful. If the authentication fails, the method proceeds to step 490 to return an error message to the user. Otherwise, the method proceeds to step 425.

In step 425, method 400 determines whether or not the received register request includes an AP-addr. For example, the value of the AP-addr may be a default value or an IP number. If the received request includes an AP-addr parameter, the method proceeds to step 440. Otherwise, the method proceeds to step 430.

In step 430, method 400 determines whether or not the user endpoint device is registering from a known address. For example, the customer may be registering from the regular service address of record. If the user endpoint device is registering from the known address, then the method proceeds to step 480 to return a success message. Otherwise, the method proceeds to step 435.

In step 435, method 400 instructs the user of the need to provide his/her current physical address to access the VoIP service (e.g., by calling a customer service number). The method then proceeds to step 491 to place the user in a suspend mode and to allow the user to interact with service provider for updating his/her address.

In step 440, method 400 retrieves the value of the AP-addr parameter from the contact header of the register request. For example, the method retrieves an IP address from the AP-addr parameter.

In step 445, method 400 determines the physical address of the access point device whose public IP address corresponds to the value of the AP-addr parameter in the register request. For example, the method searches in a location database of physical addresses of access point devices for the access point device corresponding to the IP address retrieved from the AP-addr parameter.

In step 450, method 400 determines whether or not a physical address of an access point device is found. For example, the IP number may be valid but the VoIP service provider may not have the physical address in its record. If the physical address is not found, then the method proceeds to step 491 to place the user in a suspend mode and to allow the user to interact with service provider for updating his/her address. Otherwise, the method proceeds to step 455.

In step 455, method 400 compares the physical address of the access point device with the previous known address for the user. For example, the previous VoIP session may have been from the same physical location.

In step 460, method 400 determines whether or not the physical address of the access point device is the same as the previous address for the registering user. If the address is the same as the previous address, then the method proceeds to step 480 to return a success message. Otherwise, the method proceeds to step 465.

In step 465, method 400 updates a Location Information Server (LIS) database for the registering user endpoint device. For example, the physical address of the access point device retrieved from a location database is used to update the current address for a user registering at a new location.

In step 470, method 400 determines whether or not the update was successful. If the update of the LIS database is performed successfully, then the method proceeds to step 480. Otherwise, the method proceeds to step 491 to place the user in a suspend mode and to allow the user to interact with service provider for updating his/her address.

In step 480, method 400 returns a success message to the user. For example, the method returns a "SIP 200 OK" message to the user endpoint device. The VoIP service is then provided at the current location of the user. The method then proceeds to step 495 to end processing the current register request or to step 410 to continue receiving other requests.

In step 490, method 400 returns an error message, e.g., a SIP error response. The method then proceeds to step 495 to end processing the current register request or to step 410 to continue receiving other requests.

In step 491, method 400 places the user in a suspend mode and allows the user to interact with service provider for updating his/her address. For example, the method may provide a link to an operator or a website. The method then proceeds to step 480 to return success message.

It should be noted that although not specifically specified, one or more steps of methods 300 and 400 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 3 and FIG. 4 that recite a determining operation or involve a decision, do not necessarily require that both branches of the determining operation be practiced. In other words, one of the branches of the determining operation can be deemed as an optional step.

Figure 5:
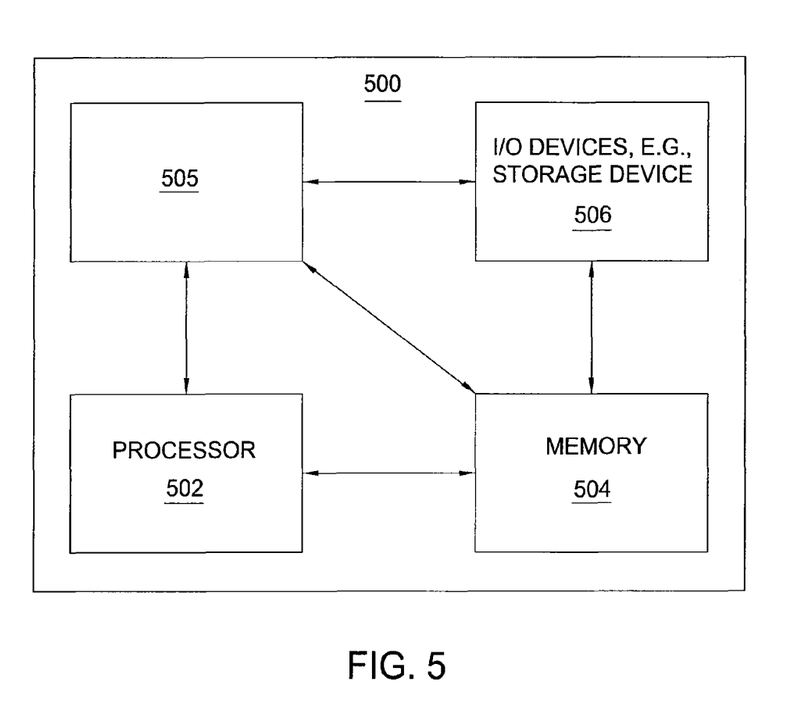
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing mobility for Voice over Internet Protocol (VoIP) services, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module or process 505 for providing mobility for Voice over Internet Protocol (VoIP) services can be loaded into memory 504 and executed by processor 502 to implement the functions as discussed above. As such, the present method 505 for providing mobility for Voice over Internet Protocol (VoIP) services (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a service in a communication network, comprising:
   receiving, by a processor, a register request from a user endpoint device via an access point device;
   retrieving, by the processor, an access point-address parameter from a contact header in the register request, wherein the access point-address parameter is populated by the access point device when the access point-address parameter is not already populated with an address of another access point device;
   determining, by the processor, a physical location of the access point device in accordance with the access point-address parameter, wherein the physical location of the access point device comprises a street address; and
   updating, by the processor, location information for the user endpoint device in accordance with the physical location of the access point device, wherein the location information for the user endpoint device is used to support an emergency service, wherein the user endpoint device is capable of communicating with the access point device over a wireless connection, wherein the updating location information comprises:
   determining the physical location of the access point device is not the same as a previous address for the user endpoint device; and
   updating a location information server database for the user endpoint device using the physical location of the access point device when the physical location of the access point device is not the same as the previous address for the user endpoint device.

2. The method of claim 1, wherein the service is a voice over internet protocol service.

3. The method of claim 1, wherein the communication network is a packet network.

4. The method of claim 3, wherein the packet network is an internet protocol network.

5. The method of claim 1, wherein the access point-address parameter carries an internet protocol address associated with the access point device.

6. The method of claim 1, wherein the emergency service is an enhanced 911 service.

7. A non-transitory computer-readable medium storing a plurality of instructions which, when executed by a processor, cause the processor to perform operations for providing a service in a communication network, the operations comprising:
receiving a register request from a user endpoint device via an access point;
retrieving an access point-address parameter from a contact header in the register request, wherein the access point-address parameter is populated by the access point device when the access point-address parameter is not already populated with an address of another access point device;
determining a physical location of the access point device in accordance with the access point-address parameter, wherein the physical location of the access point device comprises a street address; and
updating location information for the user endpoint device in accordance with the physical location of the access point device, wherein the location information for the user endpoint device is used to support an emergency service, wherein the user endpoint device is capable of communicating with the access point device over a wireless connection, wherein the updating location information comprises:
determining the physical location of the access point device is not the same as a previous address for the user endpoint device; and
updating a location information server database for the user endpoint device using the physical location of the access point device when the physical location of the access point device is not the same as the previous address for the user endpoint device.

8. The non-transitory computer-readable medium of claim 7, wherein the service is a voice over internet protocol service.

9. The non-transitory computer-readable medium of claim 7, wherein the access point-address parameter carries an internet protocol address associated with the access point device.

10. A system for providing a service in a communication network, comprising:
a processor; and
a computer-readable medium storing a plurality of instructions which, when executed by the processor, cause the processor to perform operations, the operations comprising:
receiving a register request from a user endpoint device via an access point device;
retrieving an access point-address parameter from a contact header in the register request, wherein the access point-address parameter is populated by the access point device when the access point-address parameter is not already populated with an address of another access point device;
determining a physical location of the access point device in accordance with the access point-address parameter, wherein the physical location of the access point device comprises a street address; and
updating location information for the user endpoint device in accordance with the physical location of the access point device, wherein the location information for the user endpoint device is used to support an emergency service, wherein the user endpoint device is capable of communicating with the access point device over a wireless connection, wherein the updating location information comprises:
determining the physical location of the access point device is not the same as a previous address for the user endpoint device; and
updating a location information server database for the user endpoint device using the physical location of the access point device when the physical location of the access point device is not the same as the previous address for the user endpoint device.

11. The system of claim 10, wherein the service is a voice over internet protocol service.

12. The system of claim 10, wherein the access point-address parameter carries an internet protocol address associated with the access point device.

13. The system of claim 10, wherein the emergency service is an enhanced 911 service.

* * * * *